(12) United States Patent
Lehrian et al.

(10) Patent No.: US 9,223,771 B2
(45) Date of Patent: Dec. 29, 2015

(54) LOCKING SPREADSHEET CELLS

(75) Inventors: Matthew Ross Lehrian, Pittsburg, PA (US); Christopher Douglas Weeldreyer, San Carlos, CA (US); Tsurishaddai Williamson, Pittsburgh, PA (US)

(73) Assignee: APPLE INC., Cupertino, CA (US)

( * ) Notice: Subject to any disclaimer, the term of this patent is extended or adjusted under 35 U.S.C. 154(b) by 1180 days.

(21) Appl. No.: 12/286,647

(22) Filed: Sep. 30, 2008

(65) Prior Publication Data
US 2010/0083082 A1   Apr. 1, 2010

(51) Int. Cl.
 G06F 17/00   (2006.01)
 G06F 17/24   (2006.01)

(52) U.S. Cl.
 CPC ............ *G06F 17/246* (2013.01); *G06F 17/245* (2013.01)

(58) Field of Classification Search
 CPC .............................. G06F 17/245; G06F 17/246
 USPC .......................... 715/212, 786, 217–218, 227
 See application file for complete search history.

(56) References Cited

U.S. PATENT DOCUMENTS

| | | | |
|---|---|---|---|
| 5,053,761 A * | 10/1991 | Webster, III | 345/590 |
| 6,205,454 B1 * | 3/2001 | Dauerer et al. | 715/234 |
| 6,707,449 B2 * | 3/2004 | Hinckley et al. | 345/173 |
| 7,071,919 B2 * | 7/2006 | Hinckley et al. | 345/163 |
| 7,786,975 B2 * | 8/2010 | Ording et al. | 345/156 |
| 8,640,048 B1 * | 1/2014 | Parsons | 715/788 |
| 2003/0033284 A1 * | 2/2003 | Warren et al. | 707/1 |
| 2003/0117447 A1 * | 6/2003 | Mujica et al. | 345/864 |
| 2003/0188256 A1 * | 10/2003 | Aureglia et al. | 715/503 |
| 2004/0103369 A1 * | 5/2004 | Robertson et al. | 715/509 |
| 2006/0174189 A1 * | 8/2006 | Weitzman et al. | 715/503 |
| 2008/0016437 A1 * | 1/2008 | Fenkes et al. | 715/227 |
| 2008/0082938 A1 * | 4/2008 | Buczek | 715/784 |
| 2008/0104091 A1 * | 5/2008 | Chin | 707/100 |
| 2008/0122796 A1 * | 5/2008 | Jobs et al. | 345/173 |
| 2009/0040240 A1 * | 2/2009 | Grotjohn et al. | 345/689 |
| 2009/0138815 A1 * | 5/2009 | Mercer | 715/786 |
| 2009/0313537 A1 * | 12/2009 | Fu et al. | 715/212 |

\* cited by examiner

*Primary Examiner* — Chau Nguyen
(74) *Attorney, Agent, or Firm* — Fletcher Yoder PC

(57) ABSTRACT

In some embodiments, an option to lock one or more associated cells is provided with respect to each different group of cells in a single sheet of a spreadsheet application. One or more locked cells of a group of cells do not scroll out of view at least while a portion of the group of cells is viewable in a given display view.

20 Claims, 17 Drawing Sheets

| | A | B | C | D | E |
|---|---|---|---|---|---|
| 1 | STUDENT ID | EXAM 1 | EXAM 2 | FINAL | GRADE |
| 2 | 123456 | 87 | 74 | 65 | 72.75 |
| 3 | 184792 | 86 | 73 | 88 | 83.75 |
| 4 | 198765 | 92 | 87 | 89 | 89.25 |
| 5 | 264834 | 77 | 83 | 78 | 79 |
| 6 | 267848 | 98 | 100 | 95 | 97 |
| 7 | 287947 | 62 | 66 | 74 | 69 |
| 8 | 346752 | 88 | 82 | 91 | 88 |
| 9 | 385703 | 65 | 63 | 70 | 67 |
| 10 | 436778 | 77 | 72 | 82 | 78.25 |
| 11 | 448983 | 90 | 84 | 93 | 90 |
| 12 | 478905 | 45 | 66 | 59 | 57.25 |
| 13 | 507837 | 95 | 88 | 97 | 94.25 |
| 14 | 543790 | 79 | 65 | 74 | 73 |
| 15 | 559838 | 89 | 80 | 87 | 85.75 |
| 16 | 570938 | 88 | 94 | 92 | 91.5 |
| 17 | 673920 | 72 | 75 | 71 | 72.25 |
| 18 | 691023 | 69 | 73 | 65 | 68 |
| 19 | 707893 | 71 | 87 | 91 | 85 |
| 20 | 735894 | 85 | 82 | 90 | 86.75 |
| 21 | 743258 | 84 | 79 | 80 | 80.75 |
| 22 | 812346 | 88 | 85 | 89 | 87.75 |
| 23 | 846750 | 97 | 86 | 92 | 91.75 |
| 24 | 860438 | 100 | 95 | 98 | 97.75 |
| 25 | 876543 | 94 | 88 | 89 | 90 |
| 26 | 908743 | 73 | 67 | 80 | 75 |
| 27 | 913489 | 85 | 88 | 83 | 84.75 |
| 28 | 946273 | 90 | 91 | 92 | 91.25 |
| 29 | 973625 | 86 | 72 | 89 | 84 |
| 30 | 987483 | 98 | 88 | 90 | 91.5 |
| 31 | | | | | |
| 32 | AVG. SCORE | 83.10345 | 80.44828 | 83.89655 | 82.83621 |

FIG. 1A
(Prior Art)

| | A | C | D | E |
|---|---|---|---|---|
| 1 | STUDENT ID | EXAM 2 | FINAL | GRADE |
| 5 | 264834 | 83 | 78 | 79 |
| 6 | 267848 | 100 | 95 | 97 |
| 7 | 287947 | 66 | 74 | 69 |
| 8 | 346752 | 82 | 91 | 88 |
| 9 | 385703 | 63 | 70 | 67 |
| 10 | 436778 | 72 | 82 | 78.25 |
| 11 | 448983 | 84 | 93 | 90 |
| 12 | 478905 | 66 | 59 | 57.25 |
| 13 | 507837 | 88 | 97 | 94.25 |
| 14 | 543790 | 65 | 74 | 73 |
| 15 | 559838 | 80 | 87 | 85.75 |
| 16 | 570938 | 94 | 92 | 91.5 |
| 17 | 673920 | 75 | 71 | 72.25 |
| 18 | 691023 | 73 | 65 | 68 |
| 19 | 707893 | 87 | 91 | 85 |
| 20 | 735894 | 82 | 90 | 86.75 |
| 21 | 743258 | 79 | 80 | 80.75 |
| 22 | 812346 | 85 | 89 | 87.75 |
| 23 | 846750 | 86 | 92 | 91.75 |
| 24 | 860438 | 95 | 98 | 97.75 |
| 25 | 876543 | 88 | 89 | 90 |
| 26 | 908743 | 67 | 80 | 75 |
| 27 | 913489 | 88 | 83 | 84.75 |
| 28 | 946273 | 91 | 92 | 91.25 |
| 29 | 973625 | 72 | 89 | 84 |
| 30 | 987483 | 88 | 90 | 91.5 |
| 32 | AVG. SCORE | 80.44828 | 83.89655 | 82.83621 |

| | A | B | C | D | E |
|---|---|---|---|---|---|
| 1 | STUDENT ID | EXAM 1 | EXAM 2 | FINAL | GRADE |
| 2 | 123456 | 87 | 74 | 65 | 72.75 |
| 3 | 184792 | 86 | 73 | 88 | 83.75 |
| 4 | 198765 | 92 | 87 | 89 | 89.25 |
| 5 | 264834 | 77 | 83 | 78 | 79 |
| 6 | 267848 | 98 | 100 | 95 | 97 |
| 7 | 287947 | 62 | 66 | 74 | 69 |
| 8 | 346752 | 88 | 82 | 91 | 88 |
| 9 | 385703 | 65 | 63 | 70 | 67 |
| 10 | 436778 | 77 | 72 | 82 | 78.25 |
| 11 | 448983 | 90 | 84 | 93 | 90 |
| 12 | 478905 | 45 | 66 | 59 | 57.25 |
| 13 | 507837 | 95 | 88 | 97 | 94.25 |
| 14 | 543790 | 79 | 65 | 74 | 73 |
| 1 | STUDENT ID | EXAM 1 | EXAM 2 | FINAL | GRADE |
| 2 | 123456 | 87 | 74 | 65 | 72.75 |
| 3 | 184792 | 86 | 73 | 88 | 83.75 |
| 4 | 198765 | 92 | 87 | 89 | 89.25 |
| 5 | 264834 | 77 | 83 | 78 | 79 |
| 6 | 267848 | 98 | 100 | 95 | 97 |
| 7 | 287947 | 62 | 66 | 74 | 69 |
| 8 | 346752 | 88 | 82 | 91 | 88 |
| 9 | 385703 | 65 | 63 | 70 | 67 |
| 10 | 436778 | 77 | 72 | 82 | 78.25 |
| 11 | 448983 | 90 | 84 | 93 | 90 |
| 12 | 478905 | 45 | 66 | 59 | 57.25 |
| 13 | 507837 | 95 | 88 | 97 | 94.25 |
| 14 | 543790 | 79 | 65 | 74 | 73 |
| 15 | 559838 | 89 | 80 | 87 | 85.75 |
| 16 | 570938 | 88 | 94 | 92 | 91.5 |
| 17 | 673920 | 72 | 75 | 71 | 72.25 |
| 18 | 691023 | 69 | 73 | 65 | 68 |
| 19 | 707893 | 71 | 87 | 91 | 85 |
| 20 | 735894 | 85 | 82 | 90 | 86.75 |
| 21 | 743258 | 84 | 79 | 80 | 80.75 |
| 22 | 812346 | 88 | 85 | 89 | 87.75 |
| 23 | 846750 | 97 | 86 | 92 | 91.75 |
| 24 | 860438 | 100 | 95 | 98 | 97.75 |

| | A | B | C | D | E | F |
|---|---|---|---|---|---|---|
| 2 | 123456 | 87 | 74 | 65 | 72.75 | |
| 3 | 184792 | 86 | 73 | 88 | 83.75 | |
| 4 | 198765 | 92 | 87 | 89 | 89.25 | |
| 5 | 264834 | 77 | 83 | 78 | 79 | |
| 6 | 267848 | 98 | 100 | 95 | 97 | |
| 7 | 287947 | 62 | 66 | 74 | 69 | |
| 8 | 346752 | 88 | 82 | 91 | 88 | |
| 9 | 385703 | 65 | 63 | 70 | 67 | |
| 10 | 436778 | 77 | 72 | 82 | 78.25 | |
| 11 | 448983 | 90 | 84 | 93 | 90 | |
| 12 | 478905 | 45 | 66 | 59 | 57.25 | |
| 13 | 507837 | 95 | 88 | 97 | 94.25 | |
| 14 | 543790 | 79 | 65 | 74 | 73 | |
| 15 | 559838 | 89 | 80 | 87 | 85.75 | |
| 16 | 570938 | 88 | 94 | 92 | 91.5 | |
| 17 | 673920 | 72 | 75 | 71 | 72.25 | |
| 18 | 691023 | 69 | 73 | 65 | 68 | |
| 19 | 707893 | 71 | 87 | 91 | 85 | |
| 20 | 735894 | 85 | 82 | 90 | 86.75 | |
| 21 | 743258 | 84 | 79 | 80 | 80.75 | |
| 22 | 812346 | 88 | 85 | 89 | 87.75 | |
| 23 | 846750 | 97 | 86 | 92 | 91.75 | |
| 24 | 860438 | 100 | 95 | 98 | 97.75 | |
| 25 | 876543 | 94 | 88 | 89 | 90 | |
| 26 | 908743 | 73 | 67 | 80 | 75 | |
| 27 | 913489 | 85 | 88 | 83 | 84.75 | |
| 28 | 946273 | 90 | 91 | 92 | 91.25 | |
| 29 | 973625 | 86 | 72 | 89 | 84 | |
| 30 | 987483 | 98 | 88 | 90 | 91.5 | |
| 31 | | | | | | |
| 32 | AVG. SCORE | 83.10345 | 80.44828 | 83.89655 | 82.83621 | |

Table 1

| January | February | March | April | May | June | July | August |
|---|---|---|---|---|---|---|---|
| $7.00 | $15.00 | $23.00 | $31.00 | $39.00 | $47.00 | $55.00 | $63.00 |
| $8.00 | $17.00 | $26.00 | $35.00 | $44.00 | $53.00 | $62.00 | $71.00 |
| $9.00 | $19.00 | $29.00 | $39.00 | $49.00 | $59.00 | $69.00 | $79.00 |
| $10.00 | $21.00 | $32.00 | $43.00 | $54.00 | $65.00 | $76.00 | $87.00 |
| $11.00 | $23.00 | $35.00 | $47.00 | $59.00 | $71.00 | $83.00 | $95.00 |
| $12.00 | $25.00 | $38.00 | $51.00 | $64.00 | $77.00 | $90.00 | $103.00 |
| $13.00 | $27.00 | $41.00 | $55.00 | $69.00 | $83.00 | $97.00 | $111.00 |
| $14.00 | $29.00 | $44.00 | $59.00 | $74.00 | $89.00 | $104.00 | $119.00 |
| $15.00 | $31.00 | $47.00 | $63.00 | $79.00 | $95.00 | $111.00 | $127.00 |
| $16.00 | $33.00 | $50.00 | $67.00 | $84.00 | $101.00 | $118.00 | $135.00 |
| $17.00 | $35.00 | $53.00 | $71.00 | $89.00 | $107.00 | $125.00 | $143.00 |
| $18.00 | $37.00 | $56.00 | $75.00 | $94.00 | $113.00 | $132.00 | $151.00 |
| $19.00 | $39.00 | $59.00 | $79.00 | $99.00 | $119.00 | $139.00 | $159.00 |
| $20.00 | $41.00 | $62.00 | $83.00 | $104.00 | $125.00 | $146.00 | $167.00 |

Table 2

| January | February | March | April | May | June | July | August |
|---|---|---|---|---|---|---|---|
| $1.00 | $3.00 | $5.00 | $7.00 | $9.00 | $11.00 | $13.00 | $15.00 |
| $2.00 | $5.00 | $8.00 | $11.00 | $14.00 | $17.00 | $20.00 | $23.00 |
| $3.00 | $7.00 | $11.00 | $15.00 | $19.00 | $23.00 | $27.00 | $31.00 |
| $4.00 | $9.00 | $14.00 | $19.00 | $24.00 | $29.00 | $34.00 | $39.00 |
| $5.00 | $11.00 | $17.00 | $23.00 | $29.00 | $35.00 | $41.00 | $47.00 |
| $6.00 | $13.00 | $20.00 | $27.00 | $34.00 | $41.00 | $48.00 | $55.00 |
| $7.00 | $15.00 | $23.00 | $31.00 | $39.00 | $47.00 | $55.00 | $63.00 |
| $8.00 | $17.00 | $26.00 | $35.00 | $44.00 | $53.00 | $62.00 | $71.00 |
| $9.00 | $19.00 | $29.00 | $39.00 | $49.00 | $59.00 | $69.00 | $79.00 |
| $10.00 | $21.00 | $32.00 | $43.00 | $54.00 | $65.00 | $76.00 | $87.00 |
| $11.00 | $23.00 | $35.00 | $47.00 | $59.00 | $71.00 | $83.00 | $95.00 |
| $12.00 | $25.00 | $38.00 | $51.00 | $64.00 | $77.00 | $90.00 | $103.00 |
| $13.00 | $27.00 | $41.00 | $55.00 | $69.00 | $83.00 | $97.00 | $111.00 |
| $14.00 | $29.00 | $44.00 | $59.00 | $74.00 | $89.00 | $104.00 | $119.00 |
| $15.00 | $31.00 | $47.00 | $63.00 | $79.00 | $95.00 | $111.00 | $127.00 |
| $16.00 | $33.00 | $50.00 | $67.00 | $84.00 | $101.00 | $118.00 | $135.00 |
| $17.00 | $35.00 | $53.00 | $71.00 | $89.00 | $107.00 | $125.00 | $143.00 |
| $18.00 | $37.00 | $56.00 | $75.00 | $94.00 | $113.00 | $132.00 | $151.00 |
| $19.00 | $39.00 | $59.00 | $79.00 | $99.00 | $119.00 | $139.00 | $159.00 |
| $20.00 | $41.00 | $62.00 | $83.00 | $104.00 | $125.00 | $146.00 | $167.00 |
| $21.00 | $43.00 | $65.00 | $87.00 | $109.00 | $131.00 | $153.00 | $175.00 |
| $22.00 | $45.00 | $68.00 | $91.00 | $114.00 | $137.00 | $160.00 | $183.00 |

FIG. 2B

Table 1

| January | February | March | April | May | June | July | August |
|---|---|---|---|---|---|---|---|
| $19.00 | $39.00 | $59.00 | $79.00 | $99.00 | $119.00 | $139.00 | $159.00 |
| $20.00 | $41.00 | $62.00 | $83.00 | $104.00 | $125.00 | $146.00 | $167.00 |

Table 2

| January | February | March | April | May | June | July | August |
|---|---|---|---|---|---|---|---|
| $1.00 | $3.00 | $5.00 | $7.00 | $9.00 | $11.00 | $13.00 | $15.00 |
| $2.00 | $5.00 | $8.00 | $11.00 | $14.00 | $17.00 | $20.00 | $23.00 |
| $3.00 | $7.00 | $11.00 | $15.00 | $19.00 | $23.00 | $27.00 | $31.00 |
| $4.00 | $9.00 | $14.00 | $19.00 | $24.00 | $29.00 | $34.00 | $39.00 |
| $5.00 | $11.00 | $17.00 | $23.00 | $29.00 | $35.00 | $41.00 | $47.00 |
| $6.00 | $13.00 | $20.00 | $27.00 | $34.00 | $41.00 | $48.00 | $55.00 |
| $7.00 | $15.00 | $23.00 | $31.00 | $39.00 | $47.00 | $55.00 | $63.00 |
| $8.00 | $17.00 | $26.00 | $35.00 | $44.00 | $53.00 | $62.00 | $71.00 |
| $9.00 | $19.00 | $29.00 | $39.00 | $49.00 | $59.00 | $69.00 | $79.00 |
| $10.00 | $21.00 | $32.00 | $43.00 | $54.00 | $65.00 | $76.00 | $87.00 |
| $11.00 | $23.00 | $35.00 | $47.00 | $59.00 | $71.00 | $83.00 | $95.00 |
| $12.00 | $25.00 | $38.00 | $51.00 | $64.00 | $77.00 | $90.00 | $103.00 |
| $13.00 | $27.00 | $41.00 | $55.00 | $69.00 | $83.00 | $97.00 | $111.00 |
| $14.00 | $29.00 | $44.00 | $59.00 | $74.00 | $89.00 | $104.00 | $119.00 |
| $15.00 | $31.00 | $47.00 | $63.00 | $79.00 | $95.00 | $111.00 | $127.00 |
| $16.00 | $33.00 | $50.00 | $67.00 | $84.00 | $101.00 | $118.00 | $135.00 |
| $17.00 | $35.00 | $53.00 | $71.00 | $89.00 | $107.00 | $125.00 | $143.00 |
| $18.00 | $37.00 | $56.00 | $75.00 | $94.00 | $113.00 | $132.00 | $151.00 |
| $19.00 | $39.00 | $59.00 | $79.00 | $99.00 | $119.00 | $139.00 | $159.00 |
| $20.00 | $41.00 | $62.00 | $83.00 | $104.00 | $125.00 | $146.00 | $167.00 |
| $21.00 | $43.00 | $65.00 | $87.00 | $109.00 | $131.00 | $153.00 | $175.00 |
| $22.00 | $45.00 | $68.00 | $91.00 | $114.00 | $137.00 | $160.00 | $183.00 |
| $23.00 | $47.00 | $71.00 | $95.00 | $119.00 | $143.00 | $167.00 | $191.00 |
| $24.00 | $49.00 | $74.00 | $99.00 | $124.00 | $149.00 | $174.00 | $199.00 |
| $25.00 | $51.00 | $77.00 | $103.00 | $129.00 | $155.00 | $181.00 | $207.00 |
| $26.00 | $53.00 | $80.00 | $107.00 | $134.00 | $161.00 | $188.00 | $215.00 |
| $27.00 | $55.00 | $83.00 | $111.00 | $139.00 | $167.00 | $195.00 | $223.00 |
| $28.00 | $57.00 | $86.00 | $115.00 | $144.00 | $173.00 | $202.00 | $231.00 |
| $29.00 | $59.00 | $89.00 | $119.00 | $149.00 | $179.00 | $209.00 | $239.00 |
| $30.00 | $61.00 | $92.00 | $123.00 | $154.00 | $185.00 | $216.00 | $247.00 |
| $31.00 | $63.00 | $95.00 | $127.00 | $159.00 | $191.00 | $223.00 | $255.00 |
| $32.00 | $65.00 | $98.00 | $131.00 | $164.00 | $197.00 | $230.00 | $263.00 |
| $33.00 | $67.00 | $101.00 | $135.00 | $169.00 | $203.00 | $237.00 | $271.00 |
| $34.00 | $69.00 | $104.00 | $139.00 | $174.00 | $209.00 | $244.00 | $279.00 |
| $35.00 | $71.00 | $107.00 | $143.00 | $179.00 | $215.00 | $251.00 | $287.00 |

FIG. 2C

Table 2

| January | February | March | April | May | June | July | August |
|---|---|---|---|---|---|---|---|
| $3.00 | $7.00 | $11.00 | $15.00 | $19.00 | $23.00 | $27.00 | $31.00 |
| $4.00 | $9.00 | $14.00 | $19.00 | $24.00 | $29.00 | $34.00 | $39.00 |
| $5.00 | $11.00 | $17.00 | $23.00 | $29.00 | $35.00 | $41.00 | $47.00 |
| $6.00 | $13.00 | $20.00 | $27.00 | $34.00 | $41.00 | $48.00 | $55.00 |
| $7.00 | $15.00 | $23.00 | $31.00 | $39.00 | $47.00 | $55.00 | $63.00 |
| $8.00 | $17.00 | $26.00 | $35.00 | $44.00 | $53.00 | $62.00 | $71.00 |
| $9.00 | $19.00 | $29.00 | $39.00 | $49.00 | $59.00 | $69.00 | $79.00 |
| $10.00 | $21.00 | $32.00 | $43.00 | $54.00 | $65.00 | $76.00 | $87.00 |
| $11.00 | $23.00 | $35.00 | $47.00 | $59.00 | $71.00 | $83.00 | $95.00 |
| $12.00 | $25.00 | $38.00 | $51.00 | $64.00 | $77.00 | $90.00 | $103.00 |
| $13.00 | $27.00 | $41.00 | $55.00 | $69.00 | $83.00 | $97.00 | $111.00 |
| $14.00 | $29.00 | $44.00 | $59.00 | $74.00 | $89.00 | $104.00 | $119.00 |
| $15.00 | $31.00 | $47.00 | $63.00 | $79.00 | $95.00 | $111.00 | $127.00 |
| $16.00 | $33.00 | $50.00 | $67.00 | $84.00 | $101.00 | $118.00 | $135.00 |
| $17.00 | $35.00 | $53.00 | $71.00 | $89.00 | $107.00 | $125.00 | $143.00 |
| $18.00 | $37.00 | $56.00 | $75.00 | $94.00 | $113.00 | $132.00 | $151.00 |
| $19.00 | $39.00 | $59.00 | $79.00 | $99.00 | $119.00 | $139.00 | $159.00 |
| $20.00 | $41.00 | $62.00 | $83.00 | $104.00 | $125.00 | $146.00 | $167.00 |
| $21.00 | $43.00 | $65.00 | $87.00 | $109.00 | $131.00 | $153.00 | $175.00 |
| $22.00 | $45.00 | $68.00 | $91.00 | $114.00 | $137.00 | $160.00 | $183.00 |
| $23.00 | $47.00 | $71.00 | $95.00 | $119.00 | $143.00 | $167.00 | $191.00 |
| $24.00 | $49.00 | $74.00 | $99.00 | $124.00 | $149.00 | $174.00 | $199.00 |
| $25.00 | $51.00 | $77.00 | $103.00 | $129.00 | $155.00 | $181.00 | $207.00 |
| $26.00 | $53.00 | $80.00 | $107.00 | $134.00 | $161.00 | $188.00 | $215.00 |
| $27.00 | $55.00 | $83.00 | $111.00 | $139.00 | $167.00 | $195.00 | $223.00 |
| $28.00 | $57.00 | $86.00 | $115.00 | $144.00 | $173.00 | $202.00 | $231.00 |
| $29.00 | $59.00 | $89.00 | $119.00 | $149.00 | $179.00 | $209.00 | $239.00 |
| $30.00 | $61.00 | $92.00 | $123.00 | $154.00 | $185.00 | $216.00 | $247.00 |
| $31.00 | $63.00 | $95.00 | $127.00 | $159.00 | $191.00 | $223.00 | $255.00 |
| $32.00 | $65.00 | $98.00 | $131.00 | $164.00 | $197.00 | $230.00 | $263.00 |
| $33.00 | $67.00 | $101.00 | $135.00 | $169.00 | $203.00 | $237.00 | $271.00 |
| $34.00 | $69.00 | $104.00 | $139.00 | $174.00 | $209.00 | $244.00 | $279.00 |
| $35.00 | $71.00 | $107.00 | $143.00 | $179.00 | $215.00 | $251.00 | $287.00 |
| $36.00 | $73.00 | $110.00 | $147.00 | $184.00 | $221.00 | $258.00 | $295.00 |
| $37.00 | $75.00 | $113.00 | $151.00 | $189.00 | $227.00 | $265.00 | $303.00 |
| $38.00 | $77.00 | $116.00 | $155.00 | $194.00 | $233.00 | $272.00 | $311.00 |
| $39.00 | $79.00 | $119.00 | $159.00 | $199.00 | $239.00 | $279.00 | $319.00 |
| $40.00 | $81.00 | $122.00 | $163.00 | $204.00 | $245.00 | $286.00 | $327.00 |
| $41.00 | $83.00 | $125.00 | $167.00 | $209.00 | $251.00 | $293.00 | $335.00 |
| $42.00 | $85.00 | $128.00 | $171.00 | $214.00 | $257.00 | $300.00 | $343.00 |

FIG. 2D

Table 1

| January | February | March | April | May | June | July | August |
|---|---|---|---|---|---|---|---|
| $5.00 | $11.00 | $17.00 | $23.00 | $29.00 | $35.00 | $41.00 | $47.00 |
| $6.00 | $13.00 | $20.00 | $27.00 | $34.00 | $41.00 | $48.00 | $55.00 |
| $7.00 | $15.00 | $23.00 | $31.00 | $39.00 | $47.00 | $55.00 | $63.00 |
| $8.00 | $17.00 | $26.00 | $35.00 | $44.00 | $53.00 | $62.00 | $71.00 |
| $9.00 | $19.00 | $29.00 | $39.00 | $49.00 | $59.00 | $69.00 | $79.00 |
| $10.00 | $21.00 | $32.00 | $43.00 | $54.00 | $65.00 | $76.00 | $87.00 |
| $11.00 | $23.00 | $35.00 | $47.00 | $59.00 | $71.00 | $83.00 | $95.00 |
| $12.00 | $25.00 | $38.00 | $51.00 | $64.00 | $77.00 | $90.00 | $103.00 |
| $13.00 | $27.00 | $41.00 | $55.00 | $69.00 | $83.00 | $97.00 | $111.00 |
| $14.00 | $29.00 | $44.00 | $59.00 | $74.00 | $89.00 | $104.00 | $119.00 |
| $15.00 | $31.00 | $47.00 | $63.00 | $79.00 | $95.00 | $111.00 | $127.00 |
| $16.00 | $33.00 | $50.00 | $67.00 | $84.00 | $101.00 | $118.00 | $135.00 |
| $17.00 | $35.00 | $53.00 | $71.00 | $89.00 | $107.00 | $125.00 | $143.00 |
| $18.00 | $37.00 | $56.00 | $75.00 | $94.00 | $113.00 | $132.00 | $151.00 |
| $19.00 | $39.00 | $59.00 | $79.00 | $99.00 | $119.00 | $139.00 | $159.00 |
| $20.00 | $41.00 | $62.00 | $83.00 | $104.00 | $125.00 | $146.00 | $167.00 |

Table 2

| January | February | March | April | May | June | July | August |
|---|---|---|---|---|---|---|---|
| $1.00 | $3.00 | $5.00 | $7.00 | $9.00 | $11.00 | $13.00 | $15.00 |
| $2.00 | $5.00 | $8.00 | $11.00 | $14.00 | $17.00 | $20.00 | $23.00 |
| $3.00 | $7.00 | $11.00 | $15.00 | $19.00 | $23.00 | $27.00 | $31.00 |
| $4.00 | $9.00 | $14.00 | $19.00 | $24.00 | $29.00 | $34.00 | $39.00 |
| $5.00 | $11.00 | $17.00 | $23.00 | $29.00 | $35.00 | $41.00 | $47.00 |
| $6.00 | $13.00 | $20.00 | $27.00 | $34.00 | $41.00 | $48.00 | $55.00 |
| $7.00 | $15.00 | $23.00 | $31.00 | $39.00 | $47.00 | $55.00 | $63.00 |
| $8.00 | $17.00 | $26.00 | $35.00 | $44.00 | $53.00 | $62.00 | $71.00 |
| $9.00 | $19.00 | $29.00 | $39.00 | $49.00 | $59.00 | $69.00 | $79.00 |
| $10.00 | $21.00 | $32.00 | $43.00 | $54.00 | $65.00 | $76.00 | $87.00 |
| $11.00 | $23.00 | $35.00 | $47.00 | $59.00 | $71.00 | $83.00 | $95.00 |
| $12.00 | $25.00 | $38.00 | $51.00 | $64.00 | $77.00 | $90.00 | $103.00 |
| $13.00 | $27.00 | $41.00 | $55.00 | $69.00 | $83.00 | $97.00 | $111.00 |
| $14.00 | $29.00 | $44.00 | $59.00 | $74.00 | $89.00 | $104.00 | $119.00 |
| $15.00 | $31.00 | $47.00 | $63.00 | $79.00 | $95.00 | $111.00 | $127.00 |
| $16.00 | $33.00 | $50.00 | $67.00 | $84.00 | $101.00 | $118.00 | $135.00 |
| $17.00 | $35.00 | $53.00 | $71.00 | $89.00 | $107.00 | $125.00 | $143.00 |
| $18.00 | $37.00 | $56.00 | $75.00 | $94.00 | $113.00 | $132.00 | $151.00 |
| $19.00 | $39.00 | $59.00 | $79.00 | $99.00 | $119.00 | $139.00 | $159.00 |
| $20.00 | $41.00 | $62.00 | $83.00 | $104.00 | $125.00 | $146.00 | $167.00 |
| $21.00 | $43.00 | $65.00 | $87.00 | $109.00 | $131.00 | $153.00 | $175.00 |

Table 2

| | January | February | March | April | May | June | July | August | | |
|---|---|---|---|---|---|---|---|---|---|---|
| | $1.00 | $3.00 | $5.00 | $7.00 | $9.00 | $11.00 | $13.00 | $15.00 | $3.00 | $7.00 |
| | $2.00 | $5.00 | $8.00 | $11.00 | $14.00 | $17.00 | $20.00 | $23.00 | $4.00 | $9.00 |
| | $3.00 | $7.00 | $11.00 | $15.00 | $19.00 | $23.00 | $27.00 | $31.00 | $5.00 | $11.00 |
| | $4.00 | $9.00 | $14.00 | $19.00 | $24.00 | $29.00 | $34.00 | $39.00 | $6.00 | $13.00 |
| | $5.00 | $11.00 | $17.00 | $23.00 | $29.00 | $35.00 | $41.00 | $47.00 | $7.00 | $15.00 |
| | $6.00 | $13.00 | $20.00 | $27.00 | $34.00 | $41.00 | $48.00 | $55.00 | $8.00 | $17.00 |
| | $7.00 | $15.00 | $23.00 | $31.00 | $39.00 | $47.00 | $55.00 | $63.00 | $9.00 | $19.00 |
| | $8.00 | $17.00 | $26.00 | $35.00 | $44.00 | $53.00 | $62.00 | $71.00 | $10.00 | $21.00 |
| | $9.00 | $19.00 | $29.00 | $39.00 | $49.00 | $59.00 | $69.00 | $79.00 | $11.00 | $23.00 |
| | $10.00 | $21.00 | $32.00 | $43.00 | $54.00 | $65.00 | $76.00 | $87.00 | $12.00 | $25.00 |
| | $11.00 | $23.00 | $35.00 | $47.00 | $59.00 | $71.00 | $83.00 | $95.00 | $13.00 | $27.00 |
| | $12.00 | $25.00 | $38.00 | $51.00 | $64.00 | $77.00 | $90.00 | $103.00 | $14.00 | $29.00 |
| | $13.00 | $27.00 | $41.00 | $55.00 | $69.00 | $83.00 | $97.00 | $111.00 | $15.00 | $31.00 |
| | $14.00 | $29.00 | $44.00 | $59.00 | $74.00 | $89.00 | $104.00 | $119.00 | $16.00 | $33.00 |
| | $15.00 | $31.00 | $47.00 | $63.00 | $79.00 | $95.00 | $111.00 | $127.00 | $17.00 | $35.00 |
| | $16.00 | $33.00 | $50.00 | $67.00 | $84.00 | $101.00 | $118.00 | $135.00 | $18.00 | $37.00 |
| | $17.00 | $35.00 | $53.00 | $71.00 | $89.00 | $107.00 | $125.00 | $143.00 | $19.00 | $39.00 |
| | $18.00 | $37.00 | $56.00 | $75.00 | $94.00 | $113.00 | $132.00 | $151.00 | $20.00 | $41.00 |
| | $19.00 | $39.00 | $59.00 | $79.00 | $99.00 | $119.00 | $139.00 | $159.00 | $21.00 | $43.00 |
| | $20.00 | $41.00 | $62.00 | $83.00 | $104.00 | $125.00 | $146.00 | $167.00 | | |
| | $21.00 | $43.00 | $65.00 | $87.00 | $109.00 | $131.00 | $153.00 | $175.00 | | | x: 36 pt y: 1 pt — 202

FIG. 2G

Table 1

| January | February | March | April | May | June | July | August |
|---|---|---|---|---|---|---|---|
| $5.00 | $11.00 | $17.00 | $23.00 | $29.00 | $35.00 | $41.00 | $47.00 |
| $6.00 | $13.00 | $20.00 | $27.00 | $34.00 | $41.00 | $48.00 | $55.00 |
| $7.00 | $15.00 | $23.00 | $31.00 | $39.00 | $47.00 | $55.00 | $63.00 |
| $8.00 | $17.00 | $26.00 | $35.00 | $44.00 | $53.00 | $62.00 | $71.00 |
| $9.00 | $19.00 | $29.00 | $39.00 | $49.00 | $59.00 | $69.00 | $79.00 |
| $10.00 | $21.00 | $32.00 | $43.00 | $54.00 | $65.00 | $76.00 | $87.00 |
| $11.00 | $23.00 | $35.00 | $47.00 | $59.00 | $71.00 | $83.00 | $95.00 |
| $12.00 | $25.00 | $38.00 | $51.00 | $64.00 | $77.00 | $90.00 | $103.00 |
| $13.00 | $27.00 | $41.00 | $55.00 | $69.00 | $83.00 | $97.00 | $111.00 |
| $14.00 | $29.00 | $44.00 | $59.00 | $74.00 | $89.00 | $104.00 | $119.00 |
| $15.00 | $31.00 | $47.00 | $63.00 | $79.00 | $95.00 | $111.00 | $127.00 |
| $16.00 | $33.00 | $50.00 | $67.00 | $84.00 | $101.00 | $118.00 | $135.00 |
| $17.00 | $35.00 | $53.00 | $71.00 | $89.00 | $107.00 | $125.00 | $143.00 |
| $18.00 | $37.00 | $56.00 | $75.00 | $94.00 | $113.00 | $132.00 | $151.00 |
| $19.00 | $39.00 | $59.00 | $79.00 | $99.00 | $119.00 | $139.00 | $159.00 |
| $20.00 | $41.00 | $62.00 | $83.00 | $104.00 | $125.00 | $146.00 | $167.00 |

Table 2

| January | February | March | April | May | June | July | August |
|---|---|---|---|---|---|---|---|
| $1.00 | $3.00 | $5.00 | $7.00 | $9.00 | $11.00 | $13.00 | $15.00 |
| $2.00 | $5.00 | $8.00 | $11.00 | $14.00 | $17.00 | $20.00 | $23.00 |
| $3.00 | $7.00 | $11.00 | $15.00 | $19.00 | $23.00 | $27.00 | $31.00 |
| $4.00 | $9.00 | $14.00 | $19.00 | $24.00 | $29.00 | $34.00 | $39.00 |
| $5.00 | $11.00 | $17.00 | $23.00 | $29.00 | $35.00 | $41.00 | $47.00 |
| $6.00 | $13.00 | $20.00 | $27.00 | $34.00 | $41.00 | $48.00 | $55.00 |
| $7.00 | $15.00 | $23.00 | $31.00 | $39.00 | $47.00 | $55.00 | $63.00 |
| $8.00 | $17.00 | $26.00 | $35.00 | $44.00 | $53.00 | $62.00 | $71.00 |
| $9.00 | $19.00 | $29.00 | $39.00 | $49.00 | $59.00 | $69.00 | $79.00 |
| $10.00 | $21.00 | $32.00 | $43.00 | $54.00 | $65.00 | $76.00 | $87.00 |
| $11.00 | $23.00 | $35.00 | $47.00 | $59.00 | $71.00 | $83.00 | $95.00 |
| $12.00 | $25.00 | $38.00 | $51.00 | $64.00 | $77.00 | $90.00 | $103.00 |
| $13.00 | $27.00 | $41.00 | $55.00 | $69.00 | $83.00 | $97.00 | $111.00 |
| $14.00 | $29.00 | $44.00 | $59.00 | $74.00 | $89.00 | $104.00 | $119.00 |
| $15.00 | $31.00 | $47.00 | $63.00 | $79.00 | $95.00 | $111.00 | $127.00 |
| $16.00 | $33.00 | $50.00 | $67.00 | $84.00 | $101.00 | $118.00 | $135.00 |
| $17.00 | $35.00 | $53.00 | $71.00 | $89.00 | $107.00 | $125.00 | $143.00 |
| $18.00 | $37.00 | $56.00 | $75.00 | $94.00 | $113.00 | $132.00 | $151.00 |
| $19.00 | $39.00 | $59.00 | $79.00 | $99.00 | $119.00 | $139.00 | $159.00 |
| $20.00 | $41.00 | $62.00 | $83.00 | $104.00 | $125.00 | $146.00 | $167.00 |
| $21.00 | $43.00 | $65.00 | $87.00 | $109.00 | $131.00 | $153.00 | $175.00 |

FIG. 2H

LOCKING SPREADSHEET CELLS

BACKGROUND OF THE INVENTION

The workspace of a sheet of some typical spreadsheet applications comprises a seemingly infinite grid or table that includes a very large number of rows and columns of cells. FIG. 1A illustrates a prior art example of a sheet 100 of a typical spreadsheet application.

Existing spreadsheet applications provide an option to lock or freeze one or more of the leftmost columns of cells and/or topmost rows of cells in place such that the locked rows or columns remain visible when scrolling in the associated sheet. Such a feature may be employed, for example, to keep row and column labels visible while scrolling. FIG. 1B illustrates a prior art example of freezing panes with respect to sheet 100 in a typical spreadsheet application. In the given example, row 1 and column A have been locked, which is visually indicated by a slightly darkened line at the bottom boundary of row 1 and the right side boundary of column A. As depicted, in this view, row 1 remains visible as the other rows are vertically scrolled (in the given example, the other rows have been scrolled such that row 5 is the topmost visible row below locked row 1, i.e., rows 2-4 have been scrolled out of view), and column A remains visible as the other columns are horizontally scrolled (in the given example, the columns have been scrolled such that column C is the leftmost visible column to the right of locked column A, i.e., column B has been scrolled out of view). All cells comprising a locked row or column in a sheet are typically locked, which may not be ideal if multiple different groups of data are created in a single sheet. In such cases, for example, locked rows or columns may be relevant to one group (e.g., may correspond to row and column labels of that group) but not to other groups.

Existing spreadsheet applications provide an option to split the view of a sheet. In a split view, multiple views of the same content are provided, i.e., the content of a sheet is replicated in each split. FIG. 1C illustrates a prior art example of a two-way split of sheet 100, and FIG. 1D illustrates a prior art example of a four-way split of sheet 100. In a typical spilt view of a sheet, rows and columns in a selected view may be scrolled while visible portions of the unselected views remain stationary or unscrolled.

In existing spreadsheet applications, the smallest scrolling increment available is a single row or column. That is, in existing spreadsheet applications, scrolling "jumps" one or more rows or columns in discrete, discontinuous steps. FIG. 1A and FIG. 1E illustrate a prior art example of scrolling cells in a sheet. FIG. 1A illustrates an initial unscrolled view of sheet 100, and FIG. 1E illustrates a view of sheet 100 in which the rows have been scrolled down by the smallest available scrolling increment. As depicted, the smallest scrolling increment results in a jump to the next row. That is, row 1 occupies the topmost row in the unscrolled view of FIG. 1A, and after scrolling down by the smallest available scrolling increment, row 2 occupies the topmost row as depicted in the view of FIG. 1E.

BRIEF DESCRIPTION OF THE DRAWINGS

Various embodiments of the invention are disclosed in the following detailed description and the accompanying drawings.

Figure 1D:
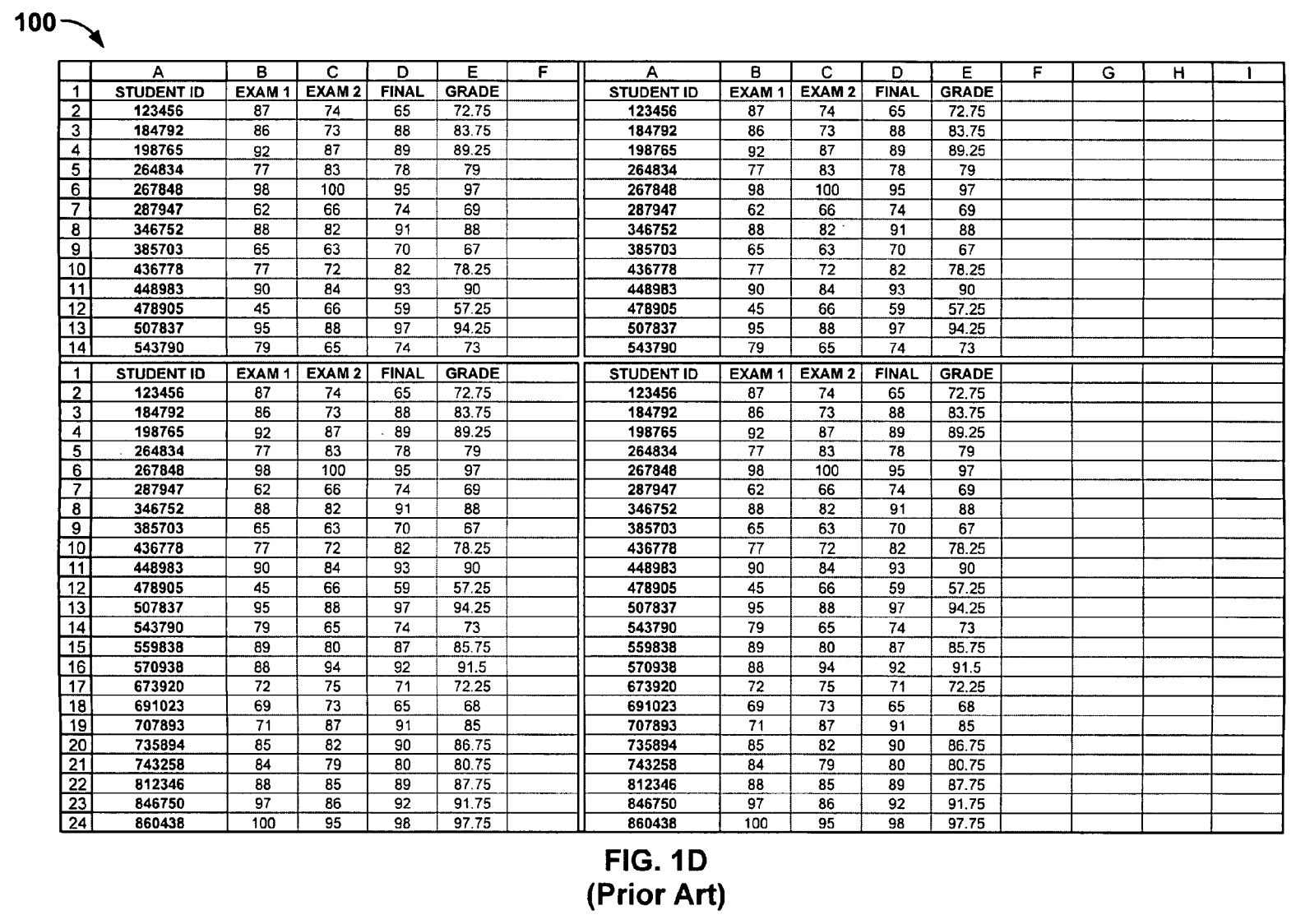

FIG. 1A illustrates a prior art example of a sheet of a typical spreadsheet application.

FIG. 1B illustrates a prior art example of freezing panes in a typical spreadsheet application.

FIG. 1C illustrates a prior art example of a two-way split of a sheet.

FIG. 1D illustrates a prior art example of a four-way split of a sheet.

FIG. 1E illustrates a scrolled view of a sheet.

FIG. 2A illustrates an embodiment of a sheet of a spreadsheet application.

FIGS. 2B-2D illustrate embodiments of locked headers.

FIGS. 2E-2H illustrate an embodiment of moving a table with floating headers.

DETAILED DESCRIPTION

Figure 3:
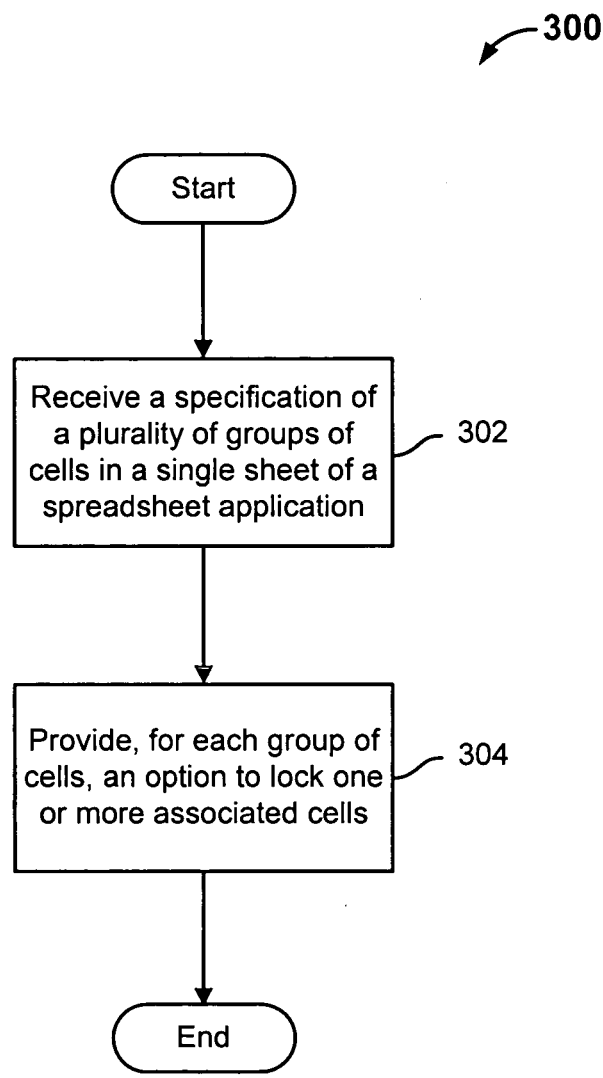
FIG. 3 illustrates an embodiment of a process for providing options to lock one or more cells in a sheet of a spreadsheet application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. As used herein, the term "host cell" refers to a cell in a formula editing mode, i.e., a cell into which a formula is being entered. In some embodiments, cells in a spreadsheet application are organized into one or more individual tables or table objects, each of which includes a desired number of rows and columns of cells. In such cases, a sheet or canvas of a spreadsheet document may include a desired number of table objects as well as any desired number of other objects such as charts, graphs, images, etc. Although in some of the examples described herein the cells of a spreadsheet application are organized into such table objects, the techniques described herein may be similarly employed with respect to other cell configurations or organizations, such as the (seemingly) infinite single grid or table of cells in each sheet of some typical spreadsheet applications that includes an unlimited (or very large) number of rows and columns of cells. Although many of the examples provided herein are with respect to a spreadsheet application, the techniques described herein may be similarly employed with respect to any application, spreadsheet or otherwise.

Figure 2A:
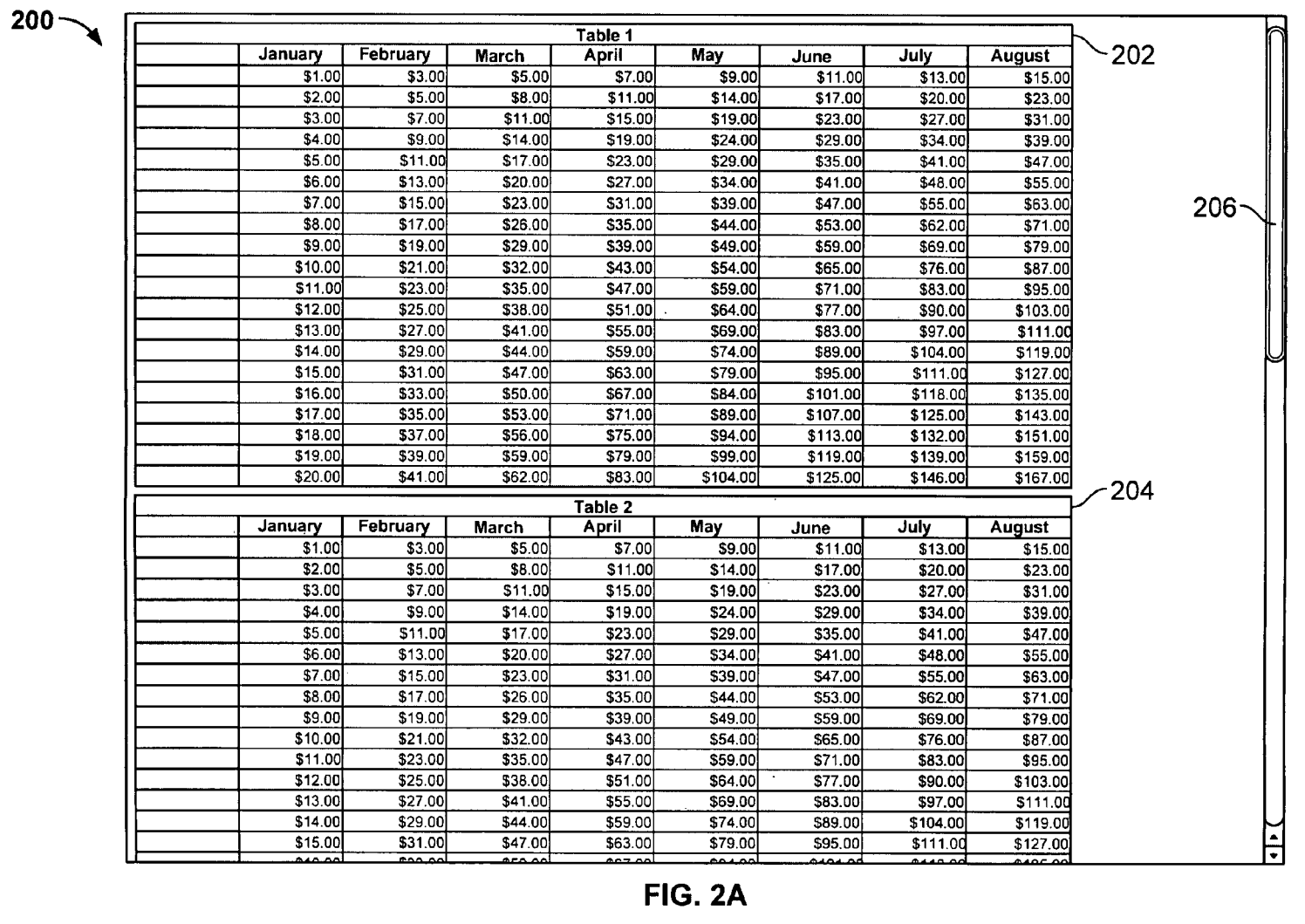

FIG. 2A illustrates an embodiment of a sheet of a spreadsheet application. In the given example, sheet 200 comprises a canvas that includes two tables: table 202 and table 204. Each table includes a desired number of rows and columns of cells. In the given example, the top two rows and the leftmost column of each table comprise headers of the table. The non-header cells of a table comprise body cells of the table. In various embodiments, any desired number of header rows and/or header columns may be included in a table. In some embodiments, header cell values may be employed to refer to associated cells in the table. In the given examples, for instance, the header cell value "January" refers to the first body column, and the header cell values "Table 1" and "Table 2" comprise whole table references that refer to all cells included in table 202 and table 204, respectively.

In some embodiments, one or more cells of a table may be frozen or locked such that the locked cells do not scroll out of a display view when the display view is scrolled at least as long as a portion of the table is still visible in the display view. The locked cells of a table are locked with respect to that table and do not affect the view of any other table, e.g., on the same sheet. Each table included on a sheet or in a document may be individually configured to have one or more locked cells, if desired. In some embodiments, it may be desirable to lock one or more of the header rows and/or header columns of a table so that the associated header cells remain visible as other (e.g., body) cells of the table scroll out of view.

FIGS. 2B-2D illustrate embodiments of locked headers with respect to tables 202 and 204 of FIG. 2A. For the given examples, assume that an option to lock the header rows (i.e., the top two rows) of each of tables 202 and 204 in FIG. 2A has been (individually) selected for each table. In some embodiments, locked cells are normally rendered (e.g., without any special visual indication to indicate that they are locked) when viewable in their actual relative positions with respect to an associated table in a given display view. Alternatively, in some embodiments, locked cells may have or be associated with a visual indication that indicates that they are locked. In some embodiments, the locked cells of a table are rendered as floating cells when their actual relative positions with respect to an associated table scroll out of view. The locked cells become "floating" cells in the sense that they are not displayed in their actual relative positions with respect to an associated table but are rather overlaid on other cells of the table that are visible in a current display view. In some embodiments, the floating cells of a table have a distinct visual representation to indicate that they are floating, i.e., not in their actual relative positions. In some such cases, the floating cells of a table are rendered with a shadow that makes them appear to float or hover above the table. In some embodiments, the locked cells of a table remain fully editable, e.g., even when they become floating cells.

In the example of FIG. 2A, an option to lock the header rows of tables 202 and 204 to prevent them from scrolling out view has been selected with respect to each of the tables. In FIG. 2A, the header rows of tables 202 and 204 are normally rendered since they are viewable in the given display view in their actual relative positions with respect to tables 202 and 204. In FIG. 2B, the display view of sheet 200 has been vertically scrolled down as indicated by the lower position of vertical scroll bar 206 in FIG. 2B relative to that in FIG. 2A. As depicted in FIG. 2B, the locked header rows of table 202 have become floating since their actual relative positions with respect to table 202 have scrolled out of view. In the given example, a shadow is rendered with respect to the header rows to create a visual appearance that indicates that they are floating, i.e., not in their actual relative positions with respect to the table. The locked headers "float" over or cover other rows of the table that would otherwise be visible in the scrolled view, i.e., if the headers were not locked. The header rows of table 204 are still normally rendered since they are still viewable in their actual relative positions with respect to table 204 in the given display view. In FIG. 2C, the display view of sheet 200 has further been vertically scrolled down as indicated by the even lower position of vertical scroll bar 206. The locked header rows of table 202 continue to float over the top two visible rows of table 202 in the given display view, and the headers of table 204 continue to be rendered normally since they continue to be viewable in their actual relative positions with respect to table 204 in the given display view.

In some embodiments, once all other cells (i.e., cells that are not locked) of a table have scrolled out of view, the table (including the locked cells) is no longer displayed in the display view. In FIG. 2D, the display view of sheet 200 has further been vertically scrolled down as indicated by the even lower position of vertical scroll bar 206. In this view, no part of table 202 (including the floating header rows) is visible, and the locked header rows of table 204 have become floating cells over the top two viewable rows of table 204 in the given display view since their actual positions relative to table 204 have been scrolled out of view. Although not depicted in the given figures, as vertical scroll bar 206 is moved in the opposite direction (i.e., up) from its position in FIG. 2D, the header rows of table 204 would be rendered normally as their actual relative positions with respect to table 204 again become viewable in the display view, the locked header rows of table 202 would first be displayed as floating header rows over table 202 as it comes into view as the display view is continued to be scrolled up, and the locked header rows of table 202 would eventually be rendered normally when their actual relative positions with respect to table 202 become viewable in the display view (such as in the display view of FIG. 2A). As illustrated in the animation of FIGS. 2A-2D and described in the associated description, in some embodiments, locked cells dynamically animate in and out of existence as floating cells as their actual relative positions with respect to an associated table scroll in and out of view.

Figure 2F:
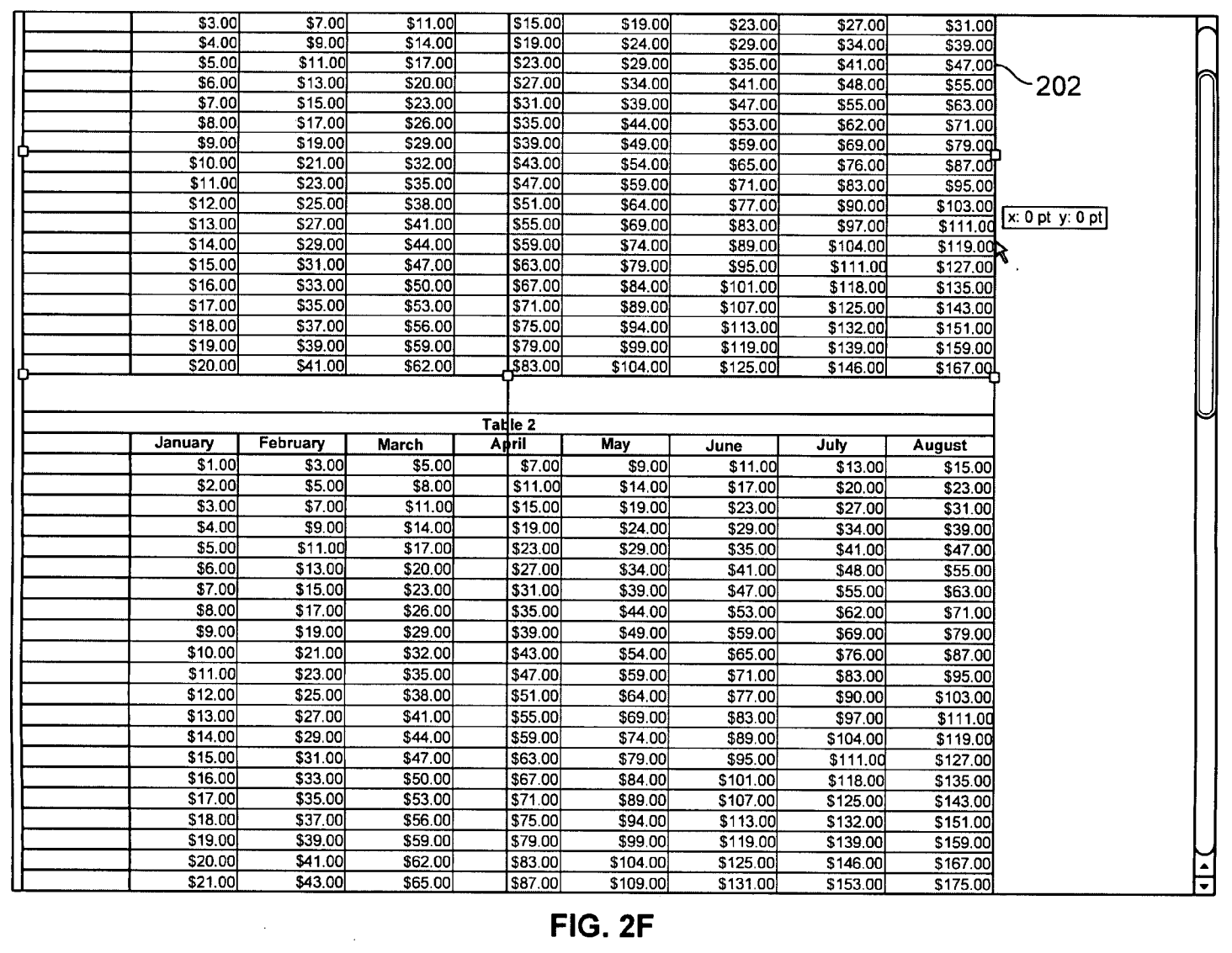

In some embodiments, floating headers associated with a table are temporarily turned-off or hidden so that a position of the table in a given display view can be more precisely identified, for example, when the table is moved. FIGS. 2E-2H illustrate an embodiment of moving table 202 of FIGS. 2A-2C. FIG. 2E illustrates an embodiment of selecting table 202. As depicted, the floating header rows of table 202 are visible. FIG. 2F illustrates an embodiment of commencing a move operation with respect to the selected table 202. For example, an appropriate mouse button is selected (i.e., held down) to start a drag operation with respect to the selected table. As depicted in FIG. 2F, the floating header rows of table 202 are no longer visible. Instead of the floating header rows, the body rows of table 202 over which the floating header rows of table 202 depicted in FIG. 2E were overlaid are displayed. That is, the rows of the table 202 that would appear in the given display view if the header rows were not locked are depicted in table 202 while it is being moved or dragged (e.g., while a mouse button associated with dragging remains selected). FIG. 2G illustrates moving table 202 towards a position to the right. As depicted, the floating headers remain turned-off or hidden during the drag operation, e.g., while a mouse button associated with dragging remains selected. FIG. 2H illustrates table 202 in a new position. As depicted, the floating headers re-appear with respect to table 202, e.g., in response to a mouse button associated with dragging being released for a drop operation.

Although the examples of FIGS. 2A-2H are with respect to locked header rows, in various embodiments, an option to lock may be selected with respect to any one or more cells of a table. As depicted, in some embodiments, the representation of locked cells dynamically changes between floating and normal views, as applicable, as an associated display view is vertically and/or horizontally scrolled and/or resized.

FIG. 3 illustrates an embodiment of a process for providing options to lock one or more cells in a sheet of a spreadsheet application. Process 300 starts at 302 at which a specification of a plurality of different groups of cells in a single sheet of a spreadsheet application is received. In some embodiments, each group comprises a table of cells included in a sheet or on a canvas of a spreadsheet application. At 304, an option to lock one or more associated cells is provided with respect to each group of cells. In some embodiments, the option includes options to lock one or more associated rows and/or columns. In some embodiments, the option includes options to lock one or more associated header rows and/or header columns.

Figure 4:
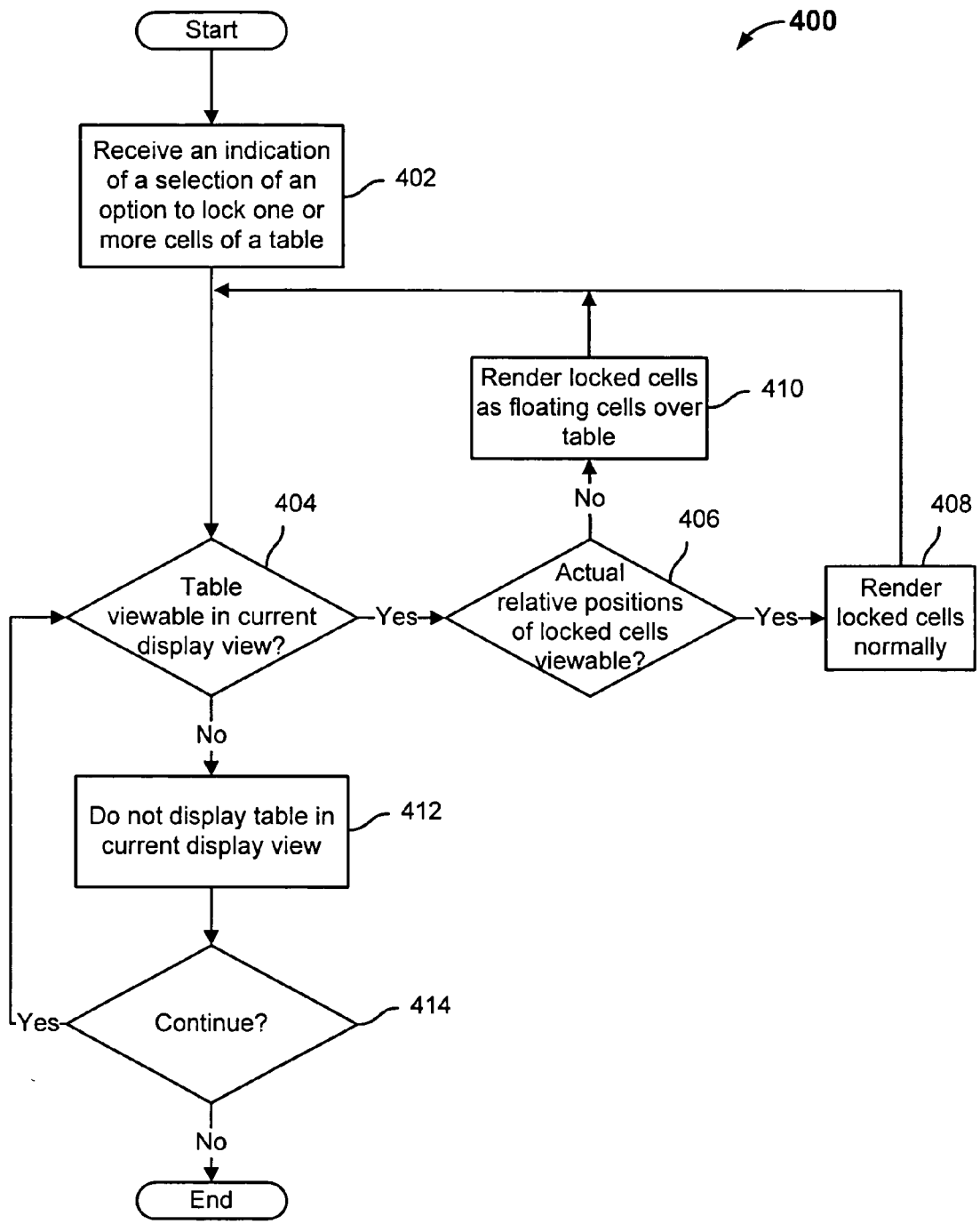
FIG. 4 illustrates an embodiment of a process for rendering locked cells.

FIG. 4 illustrates an embodiment of a process for rendering locked cells. For example, process 400 may be employed with respect to the examples of FIGS. 2A-2D. Process 400 starts at 402 at which an indication of a selection of an option to lock one or more cells of a table is received with respect to the table. In some embodiments, the one or more cells comprise one or more rows and/or columns of the table. At 404, it is determined if the table is viewable in a current display view. If it is determined at 404 that the table is viewable in the current display view, it is determined at 406 whether the actual relative positions of the locked cells with respect to the table are viewable in the current display view. If it is determined at 406 that the actual relative positions of the locked cells with respect to the table are viewable in the current display view, the locked cells are rendered normally (e.g., without any special visual distinction indicating that they are locked) at 408, and process 400 returns to step 404. In some embodiments, rendering locked cells normally includes rendering the locked cells with a visual indication that indicates that the cells are locked. If it is determined at 406 that the actual relative positions of the locked cells with respect to the table are not viewable in the current display view, the locked cells are rendered as floating cells over the table at 410, and process 400 returns to step 404. If it is determined at 404 that the table is not viewable in the current display view, no part of the table is displayed in the current display view at 412. At 414, it is determined whether to continue process 400. For example, in some embodiments, it is determined at 414 whether a sheet that includes the table is still being displayed. If it is determined at 414 to continue, process 400 returns to step 404. If it is determined at 414 not to continue, process 400 ends.

In some embodiments, process 400 is independently employed with respect to each of a plurality of sets of locked cells in a table. In some embodiments, process 400 is employed with respect to locked header rows and/or locked header columns of a table. In some embodiments, in the cases in which the header rows and the header columns are both locked, process 400 is independently employed with respect to each header dimension (i.e., row and column). In some embodiments, process 400 is independently employed for each table that includes locked cells.

Figure 5:
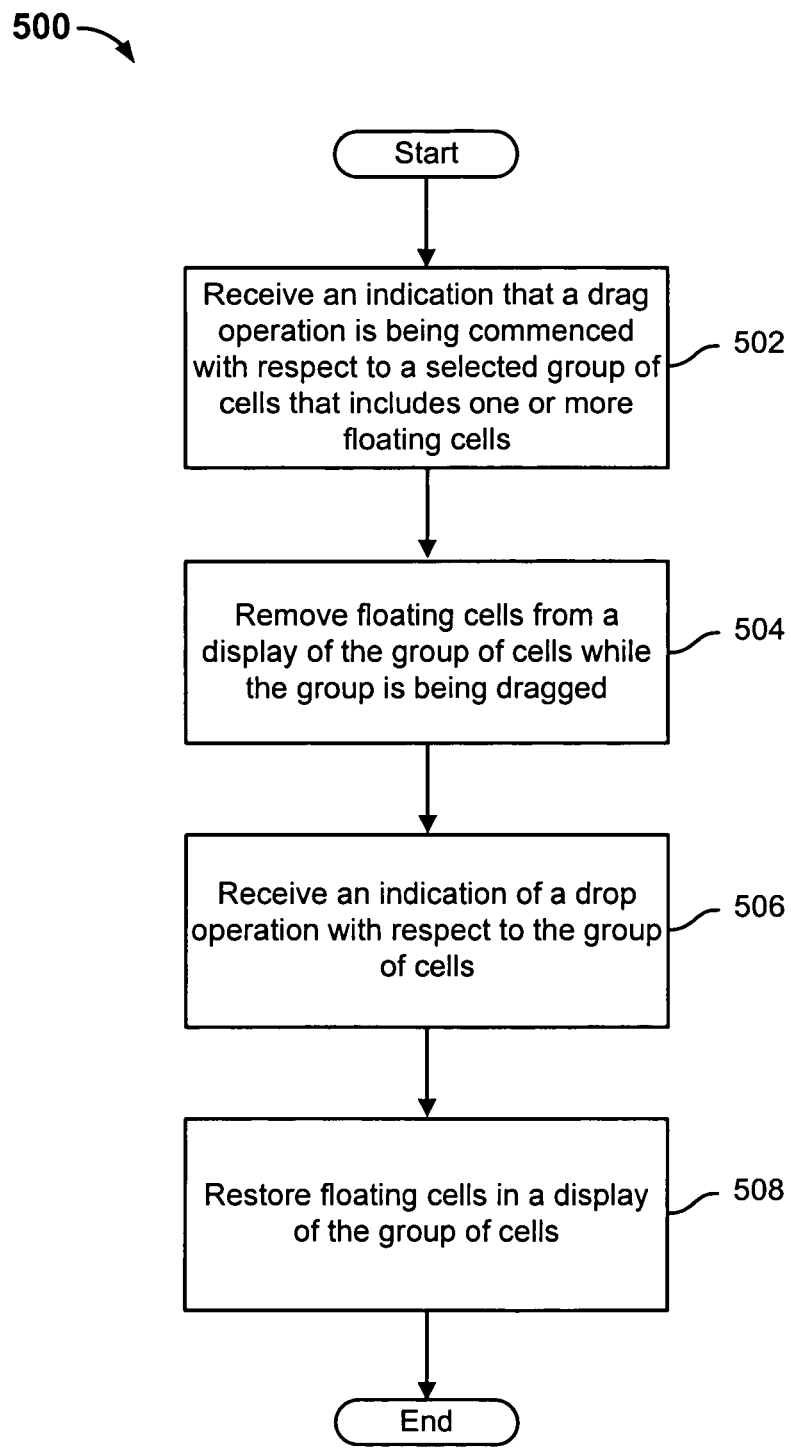
FIG. 5 illustrates an embodiment of a process for moving a group of cells.

FIG. 5 illustrates an embodiment of a process for moving a group of cells. For example, process 500 may be employed with respect to moving table 202 in FIGS. 2E-2H. At 502, an indication that a drag operation is being commenced with respect to a selected group of cells that includes one or more floating cells is received. In some embodiments, the indication comprises an indication that a mouse button associated with dragging is selected (i.e., held down). At 504, the floating cells are removed or hidden from a display of the group of cells while the group is being dragged such that only the cells of the group of cells that would be displayed in a current display view if the group of cells did not include any locked cells are displayed. At 506, an indication of a drop operation is received with respect to the group of cells. At 508, the floating cells associated with the group of cells are restored in a display of the group of cells. Process 500 subsequently ends.

In some embodiments, the cells included in a sheet of a spreadsheet may be smoothly scrolled such that scrolling the cells does not jump per-row or per-column. In such cases, rows or columns of cells may be scrolled such that they are partially out of view. Smooth scrolling is depicted in the examples of FIGS. 2B-2D. In each of FIGS. 2B and 2C, the row directly below the floating header rows in table 202 is partially scrolled out of view. In FIG. 2D, the row directly below the floating header rows in table 204 is almost completely scrolled out of view, but a portion of the row is still visible under the floating header rows. Although depicted with respect to floating header rows in the examples of FIGS. 2B-2D, smooth scrolling may be available in any appropriate context, such as when scrolling cells of a table that does not have any locked cells, scrolling the cells of a sheet of a spreadsheet application that comprises a single grid or table of cells, etc.

Figure 6:
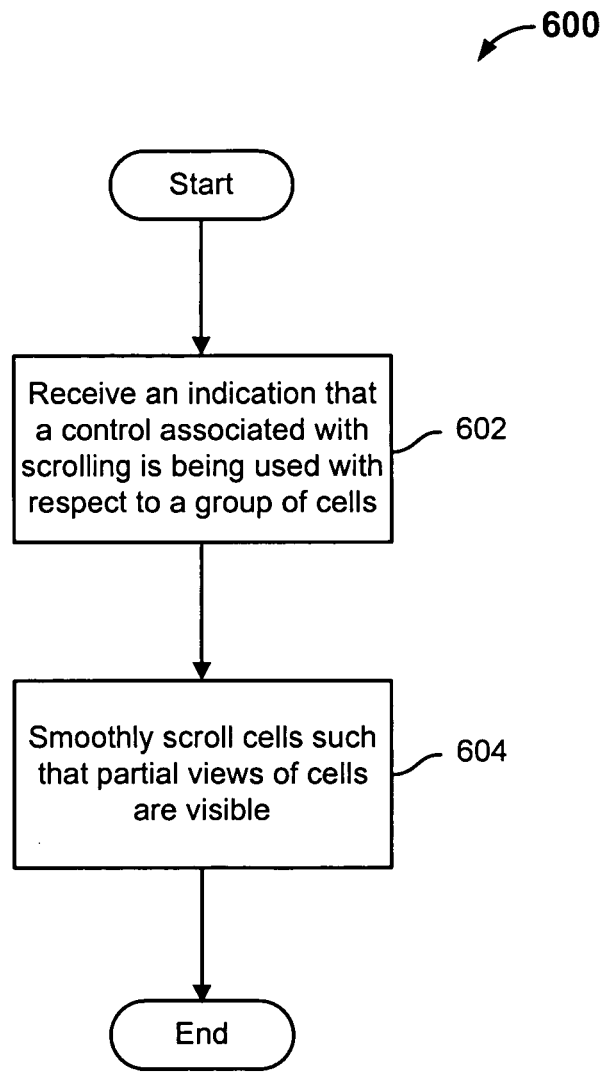
FIG. 6 illustrates an embodiment of a process for scrolling in a spreadsheet application.

FIG. 6 illustrates an embodiment of a process for scrolling in a spreadsheet application. For example, process 600 may be employed with respect to the scrolling examples illustrated in FIGS. 2B-2D. Process 600 starts at 602 at which an indication is received that a control associated with scrolling is being exercised with respect to a group of cells. In various embodiments, the control may comprise any scroll control, such as a user interface scroll control such as scroll bar 206 in FIGS. 2A-2D, a peripheral scroll control such as the scroll ball or wheel on a mouse, etc. At 604, the cells are smoothly scrolled such that partial views of the cells are visible during scrolling. In some embodiments, smoothly scrolling the cells gives at least a visual impression of continuous or nearly continuous scrolling. Cells may be smoothly scrolled in the horizontal and/or vertical directions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product embodied in a non-transitory computer readable storage medium and comprising computer instructions for:
  providing with respect to each of a plurality of groups of cells in a single sheet of a spreadsheet application an option to lock one or more cells associated with each group, wherein the option provided with respect to each group permits cells of each group to be locked independently of cells of other groups of the plurality of groups;
  receiving an input configured to lock one or more cells of a first group of cells of the plurality of groups of cells; and
  locking the cells of the first group of cells when the locked cells of the first group of cells are scrolled out of view of a display and when at least a portion of the first group of cells is in view of the display, wherein locking the cells of the first group of cells comprises applying a visual effect to the locked cells when actual relative positions of the locked cells of the first group of cells have scrolled out of view of the display;
  rendering locked cells of the first group of cells as floating cells when actual relative positions of the locked cells of the first group of cells have scrolled out of view of the display; and
  temporarily hiding the floating cells when the first group of cells is being transferred from a first position relative to the single sheet to a second position relative to the single sheet, wherein the first position is spatially different from the second position with respect to cells in the single sheet, and wherein the floating cells reappear after the first group of cells are transferred.

2. The computer program product recited in claim 1, wherein each of the plurality of groups of cells comprises a table of cells.

3. The computer program product recited in claim 1, wherein the option comprises options to lock one or more rows of cells, one or more columns of cells, or both.

4. The computer program product recited in claim 1, further comprising computer instructions for rendering the locked cells of the first group of cells without any visual indication that indicates that the locked cells are locked while the locked cells are viewable in their actual relative positions with respect to the first group of cells.

5. The computer program product recited in claim 1, wherein the floating cells are rendered with a distinct visual representation.

6. The computer program product recited in claim 1, wherein the floating cells are overlaid on other unlocked cells that would otherwise be viewable in the display.

7. The computer program product recited in claim 1, wherein a partial view of a first set of cells that have not been locked immediately adjacent to the locked cells is always viewable.

8. A system, comprising:
  a processor configured to:
    provide with respect to each of a plurality of groups of cells in a single sheet of a spreadsheet application an option to lock one or more cells associated with each group, wherein the option provided with respect to each group permits cells of each group to be locked independently of cells of other groups of the plurality of groups;
    receive an input configured to lock one or more cells of a first group of cells of the plurality of groups of cells; and
    lock the cells of the first group of cells when the locked cells of the first group of cells are scrolled out of view of a display and when at least a portion of the first group of cells is in view of the display, wherein the locked cells of the first group of cells are depicted with a shadow when actual relative positions of the locked cells of the first group of cells have scrolled out of view of the display;
    render the locked cells of the first group of cells as floating cells if actual relative positions of the locked cells of the first group of cells are scrolled out of view of the display;
    temporarily hide the floating cells when the first group of cells is being transferred from a first position relative to the single sheet to a second position relative to the single sheet, wherein the first position is spatially different from the second position with respect to cells the single sheet, and wherein the floating cells reappear after the first group of cells are transferred; and
  a memory coupled to the processor and configured to provide the processor with instructions.

9. The system of claim 8, wherein each of the plurality of groups of cells comprises a table of cells.

10. The system of claim 8, wherein the option comprises options to lock one or more rows of the cells, one or more columns of the cells, or both.

11. The system of claim 8, wherein the processor is configured to render the locked cells of the first group of cells without any visual indication that indicates that the locked cells are locked while the locked cells are viewable in their actual relative positions with respect to the first group of cells.

12. The system of claim 8, wherein the floating cells are rendered with a distinct visual representation.

13. The system of claim 8, wherein the floating cells are overlaid on other unlocked cells that would otherwise be viewable in the display.

14. A method, comprising:
  using a processor to provide with respect to each of a plurality of groups of cells in a single sheet of a spreadsheet application an option to lock one or more cells associated with each group, wherein the option provided with respect to each group permits cells of each group to be locked independently of cells of other groups of the plurality of groups;
  receiving an input configured to lock one or more cells of a first group of cells the plurality of groups of cells;
  locking the cells of the first group of cells when the locked cells of the first group of cells are scrolled out of view of a display and when at least a portion of the first group of cells is in view of the display, wherein locking the cells of the first group of cells comprises depicting the locked cells as being offset from an original position in the first group of cells when actual relative positions of the locked cells of the first group of cells have scrolled out of view of the display;
  rendering the locked cells of the first group of cells as floating cells when actual relative positions of the locked cells of the first group of cells have scrolled out of view of the display; and
  temporarily hiding the floating cells when the first group of cells is being transferred from a first position relative to the single sheet to a second position relative to the single sheet, wherein the first position is spatially different from the second position with respect to cells in the single sheet, and wherein the floating cells reappear after the first group of cells are transferred.

15. The method of claim 14, wherein each of the plurality of groups of cells comprises a table of cells.

16. The method of claim 14, wherein the option comprises options to lock one or more rows of the cells, one or more columns of the cells, or both.

17. The method of claim 14, comprising rendering the locked cells of the first group of cells without any visual indication that indicates that the locked cells are locked while the locked cells are viewable in their actual relative positions with respect to the first group of cells.

18. The method of claim 14, wherein the floating cells are rendered with a distinct visual representation.

19. The method of claim 14, wherein the floating cells are overlaid on other unlocked cells that would otherwise be viewable in the display.

20. The method of claim 14, wherein a partial view of a first set of cells that have not been locked immediately adjacent to the locked cells is always viewable.

\* \* \* \* \*